United States Patent
Wada

(10) Patent No.: US 11,214,096 B2
(45) Date of Patent: Jan. 4, 2022

(54) PNEUMATIC TYRE

(71) Applicant: Sumitomo Rubber Industries, Ltd., Hyogo (JP)

(72) Inventor: Shoichi Wada, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 251 days.

(21) Appl. No.: 16/420,241

(22) Filed: May 23, 2019

(65) Prior Publication Data

US 2019/0389253 A1 Dec. 26, 2019

(30) Foreign Application Priority Data

Jun. 20, 2018 (JP) .............................. JP2018-117250

(51) Int. Cl.
*B60C 11/01* (2006.01)
*B60C 13/02* (2006.01)
*B60C 11/13* (2006.01)
*B60C 11/03* (2006.01)

(52) U.S. Cl.
CPC .......... *B60C 11/01* (2013.01); *B60C 11/0306* (2013.01); *B60C 11/1315* (2013.01); *B60C 13/02* (2013.01); *B60C 2011/1338* (2013.01)

(58) Field of Classification Search
CPC ..... B60C 13/02; B60C 11/01; B60C 11/0306; B60C 11/1315; B60C 2011/1338; B60C 13/00
See application file for complete search history.

(56) References Cited

U.S. PATENT DOCUMENTS

2017/0197474 A1* 7/2017 Ishigaki ................ B60C 13/002

FOREIGN PATENT DOCUMENTS

| JP | 2003112505 A | * | 4/2003 | ............ B60C 13/02 |
| JP | 2004291937 A | * | 10/2004 | ............ B60C 13/02 |
| JP | 2018-016202 A |   | 2/2018 |                         |

* cited by examiner

*Primary Examiner* — Katelyn W Smith
*Assistant Examiner* — Philip N Schwartz
(74) *Attorney, Agent, or Firm* — Studebaker & Brackett PC

(57) ABSTRACT

A pneumatic tyre includes a tread portion, and a pair of buttress portions each extending inwardly in a tyre radial direction from a respective one of tread edges. At least one of the pair of buttress portions is provided with side protectors protruding outwardly in a tyre axial direction. The side protectors include first protectors arranged in a tyre circumferential direction. Each first protector includes a lateral V-shaped portion including a first inclined element inclined with respect to the tyre circumferential direction and a second inclined element inclined in an opposite direction to the first inclined element with respect to the tyre circumferential direction and connected to the first inclined element.

19 Claims, 5 Drawing Sheets

PNEUMATIC TYRE

BACKGROUND ART

Field of the Disclosure

The present disclosure relates to a pneumatic tyre which is suitable for off-road traveling.

Description of the Related Art

The following Patent document 1 discloses a pneumatic tyre with sidewall portions provided with a plurality of side protectors protruding outwardly in the tyre axial direction.

PATENT DOCUMENT

[Patent document 1] JP2018-016202A1

SUMMARY OF THE DISCLOSURE

Generally, the side protectors provide a larger rubber gauge in sidewall portions, helping to suppress damages, e.g., cuts, on the sidewall portions due to contact with rocks and the like when off-road traveling. Further, when tyres travel in mud terrain, the side protectors sink in mud, shearing mud so as to increase traction using radial edge components thereof.

Recent years, larger traction when off-road traveling has been required for pneumatic tyre. Thus, the side protectors disclosed in Patent document 1 has a room for further improvement.

The present disclosure has been made in view of the above circumstances and has a major object to provide a pneumatic tyre capable of increasing traction while ensuring cut resistance.

According to one aspect of the disclosure, a pneumatic tyre includes a tread portion, and a pair of buttress portions each extending inwardly in a tyre radial direction from a respective one of tread edges. At least one of the pair of buttress portions is provided with side protectors protruding outwardly in a tyre axial direction. The side protectors include first protectors arranged in a tyre circumferential direction. Each first protector includes a lateral V-shaped portion including a first inclined element inclined with respect to the tyre circumferential direction and a second inclined element inclined in an opposite direction to the first inclined element with respect to the tyre circumferential direction and connected to the first inclined element.

In another aspect of the disclosure, an angle of the first inclined element with respect to the tyre circumferential direction and an angle of the second inclined element with respect to the tyre circumferential direction may be equal to or less than 60 degrees.

In another aspect of the disclosure, an angle between the first inclined element and the second inclined element may be in a range of from 30 to 70 degrees.

In another aspect of the disclosure, protruding heights of the first protectors may be in a range of from 2.0 to 10.0 mm, and widths of the first inclined element and the second inclined element perpendicular to respective longitudinal direction thereof may be in a range of from 5.0 to 15.0 mm.

In another aspect of the disclosure, in each first protector, the first inclined element may be located outwardly in the tyre radial direction of the second inclined element, and the first inclined element may be connected to a radial-direction element that extends toward the tread portion in parallel with the tyre radial direction.

In another aspect of the disclosure, the side protectors may further include second protectors different in shape from the first protectors. The second protectors may be arranged between first protectors with gaps in the tyre circumferential direction. At least one of the gaps may be provided with ribs having smaller protruding heights than those of the first protectors and the second protectors.

In another aspect of the disclosure, protruding heights of the second protectors may be in a range of from 2.0 to 10.0 mm.

In another aspect of the disclosure, the ribs may be inclined in a same direction as with one another with respect to the tyre circumferential direction.

In another aspect of the disclosure, the ribs may connect the first protectors and the second protectors.

In another aspect of the disclosure, the side protectors may further include second protectors different in shape from the first protectors. The second protectors may be arranged between first protectors with gaps in the tyre circumferential direction. At least one of the gaps may be provided with ribs having smaller protruding heights than those of the first protectors and the second protectors, and the ribs may be inclined in a same direction as the first inclined element.

In another aspect of the disclosure, protruding heights of the ribs may be in a range of from 0.5 to 3.0 mm, widths of the ribs perpendicular to respective longitudinal directions thereof may be in a range of from 0.5 to 2.5 mm, and the ribs may be arranged at pitches in a range of from 2.0 to 8.5 mm.

DESCRIPTION OF THE PREFERRED EMBODIMENTS

An embodiment of the present disclosure will be explained below with reference to the accompanying drawings.

Figure 1:
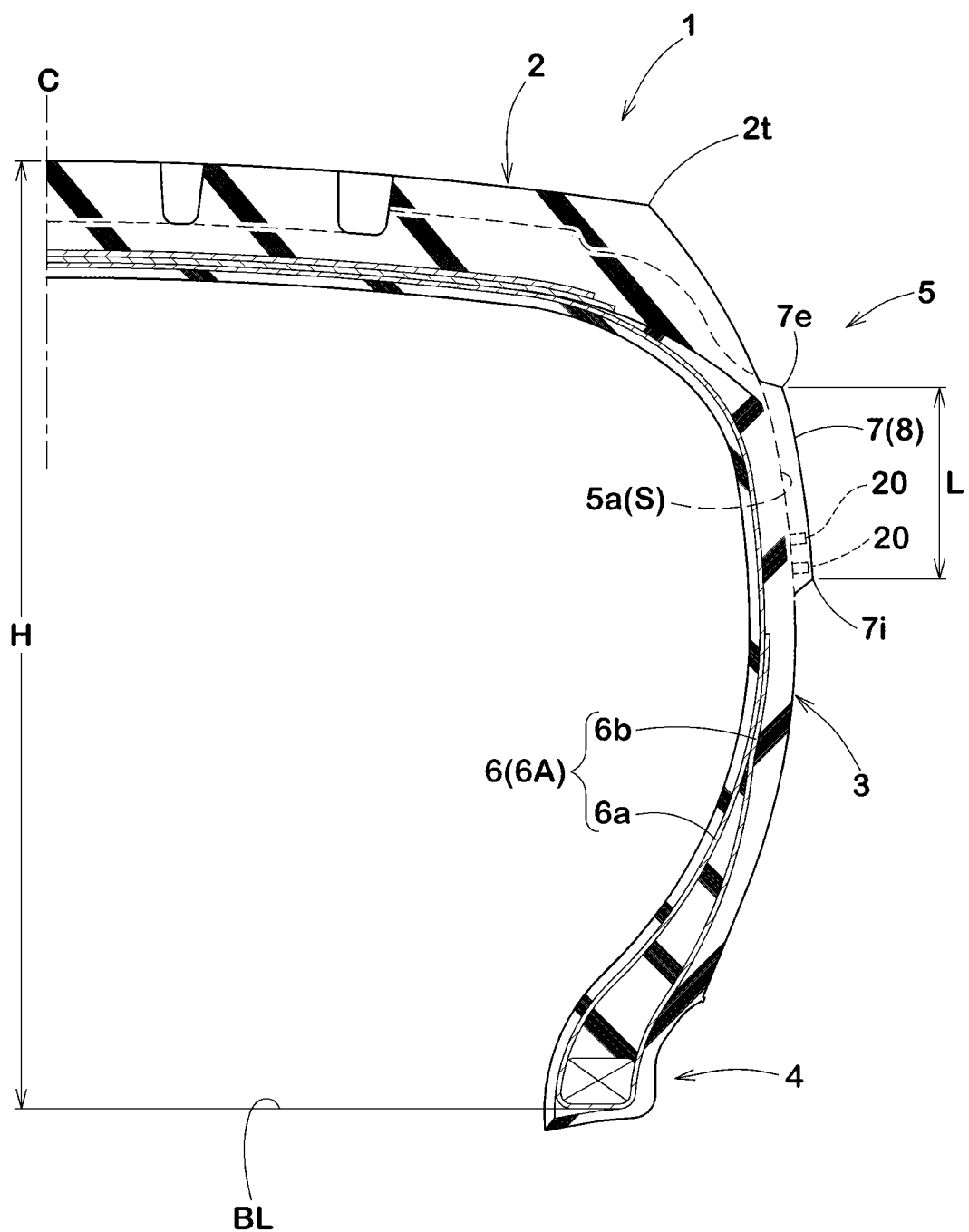
FIG. 1 is a cross-sectional view of a pneumatic tyre according to an embodiment of the disclosure.

FIG. 1 illustrates a cross-sectional view of the right half portion of a pneumatic tyre (hereinafter, simply referred to as "tyre") 1 including the tyre axis (not illustrated) under a normal state in accordance with an embodiment of the disclosure.

In this embodiment, as a preferred aspect, an all-season tyre for four-wheel-drive vehicle is illustrated. Note that needless to say the present disclosure can be used for tyres belonging to other categories, e.g., for light-truck and heavy-duty vehicle use.

As used herein, the normal state is such that the tyre 1 is mounted on a standard wheel rim (not illustrated) with a standard pressure but is loaded with no tyre load. As used herein, dimensions of respective portions of the tyre 1 are values measured under the normal state unless otherwise noted.

The standard wheel rim is a wheel rim officially approved for each tyre by standards organizations on which the tyre 1 is based, wherein the standard wheel rim is the "standard rim" specified in JATMA, the "Design Rim" in TRA, and the "Measuring Rim" in ETRTO, for example.

The standard pressure is a standard pressure officially approved for each tyre by standards organizations on which the tyre 1 is based, wherein the standard pressure is the "maximum air pressure" in JATMA, the maximum pressure given in the "Tire Load Limits at Various Cold Inflation Pressures" table in TRA, and the "Inflation Pressure" in ETRTO, for example.

The tyre 1 according to the embodiment includes a toroidal carcass 6 extending between a pair of bead portions 4 through a tread portion 2 that comes into contact with the ground and a pair of sidewall portions 3. The carcass 6 includes at least one carcass ply 6A (e.g. a single carcass ply in this embodiment) of carcass cords which are oriented at an angle of from 70 to 90 degrees with respect to the tyre circumferential direction, for example. The carcass ply 6A includes a main portion 6a extending inwardly in the tyre radial direction of the bead portions 4, and a pair of turned-up portions 6b each turned up around a respective one of the bead cores.

In this embodiment, the tyre 1 includes a pair of buttress portions 5 each extending inwardly in the tyre radial direction from a respective one of tread edges 2t of the tread portion 2. The tread edges 2t are the axial outermost edges of the ground contacting patch of the tyre 1 which occurs under the normal state of the tyre loaded with a standard tyre load when the camber angle of the tyre is zero.

As used herein, the standard tyre load is a tyre load officially approved or recommended for the tyre 1 by standards organizations, wherein the standard load is the "maximum load capacity" in JATMA, the maximum value given in the above-mentioned table in TRA or the like, and the "LOAD CAPACITY" in ETRTO.

In this embodiment, at least one of the buttress portions 5 is provided with side protectors 7 protruding outwardly in the tyre axial direction. The side protectors 7, when traveling off-road, e.g., roads covered with rocks, can exhibit high cut resistance performance by suppressing cuts on the buttress portions 5 of the tyre 1. Preferably, the side protectors 7 are provided on both buttress portions 5.

Figure 2:
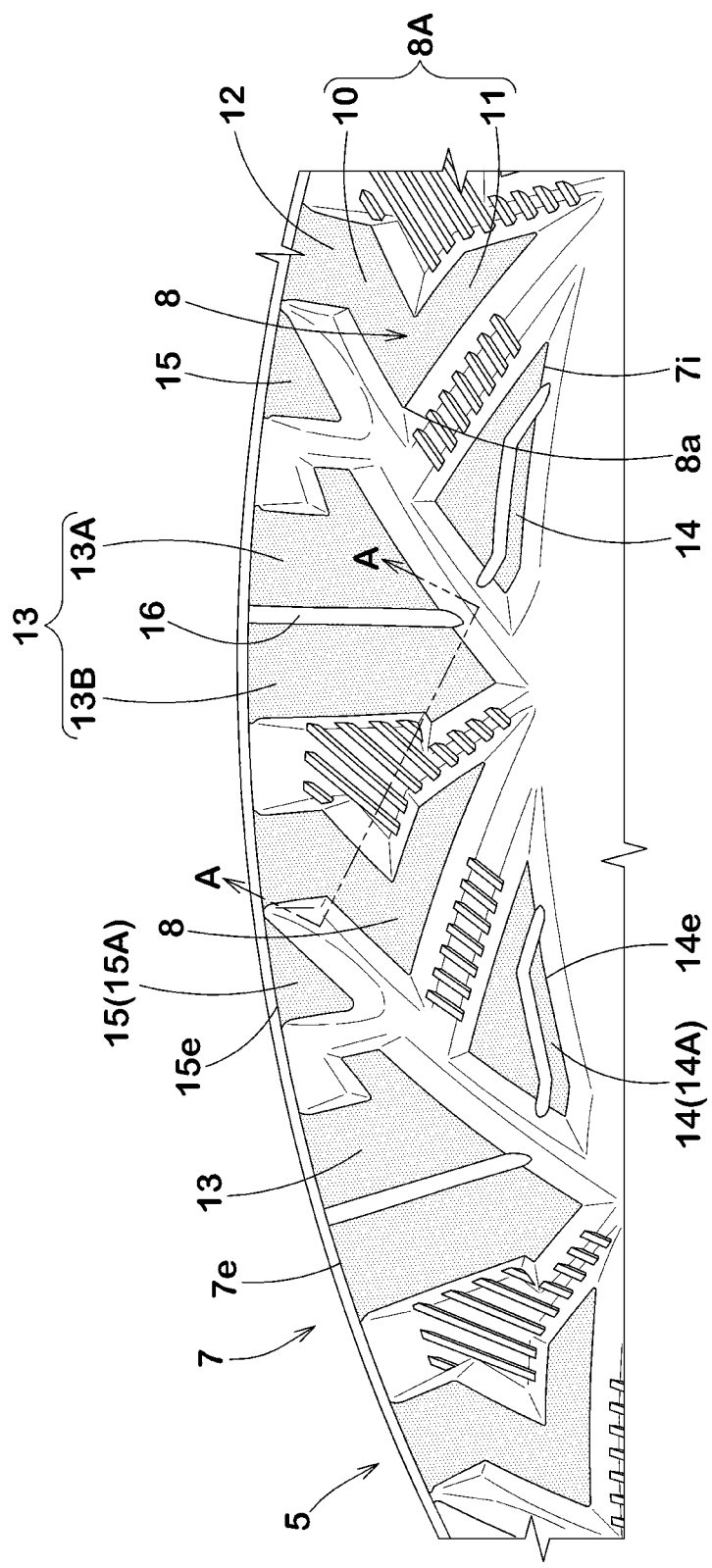
FIG. 2 is a side view of a buttress portion.

FIG. 2 illustrates a side view of one of the buttress portions 5. As illustrated in FIG. 2, the side protectors 7, in this embodiment, include first protectors 8 arranged in the tyre circumferential direction. In this embodiment, each first protector 8 includes a lateral V-shaped portion 8A that includes a first inclined element 10 inclined with respect to the tyre circumferential direction and a second inclined element 11 inclined in an opposite direction to the first inclined element 10 with respect to the tyre circumferential direction and connected to the first inclined element 10. Thus, when the tyre 1 travels in mud, the first protectors 8 can shear mud effectively, increasing traction.

The first inclined element 10, in this embodiment, is arranged outwardly in the tyre radial direction of the second inclined element 11. The first inclined element 10, in this embodiment, is inclined in a first side (the right side in FIG. 1) in the tyre circumferential direction while extending outwardly in the tyre radial direction. The second inclined element 11, in this embodiment, is inclined in the first side in the tyre circumferential direction while extending inwardly in the tyre radial direction. The first inclined element 10 and the second inclined element 11, in this embodiment, are connected with each other at a second side in the tyre circumferential direction of each first protector 8 to form a vertex 8a.

Figure 3:
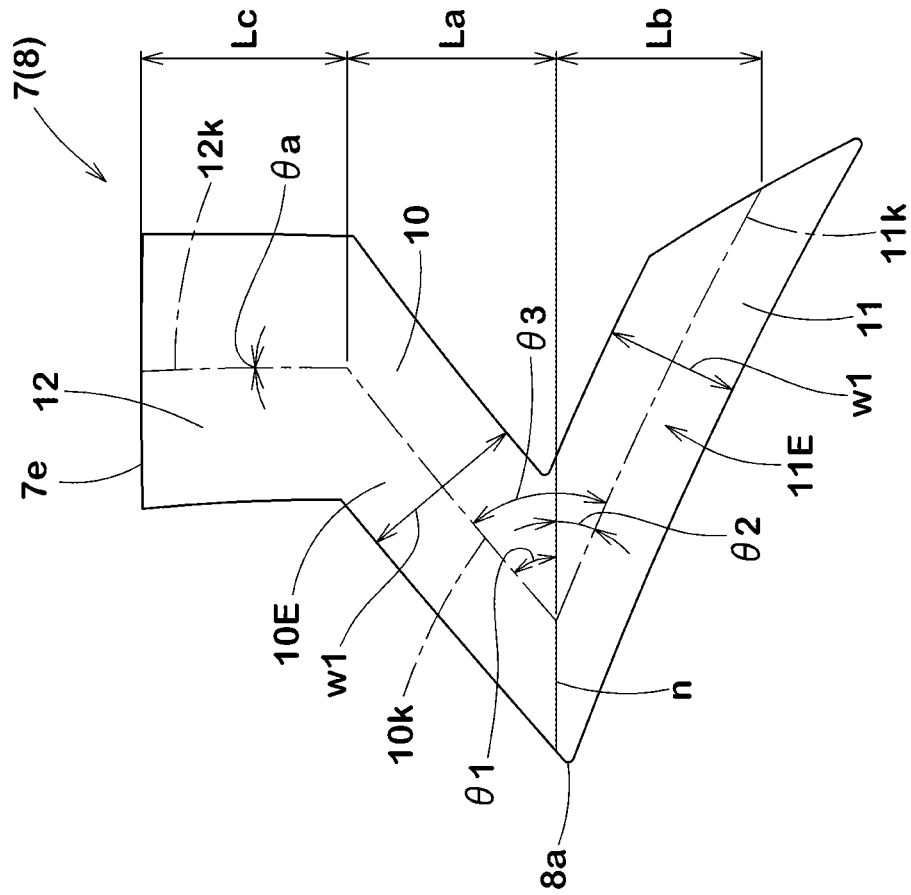
FIG. 3 is an enlarged view of a first protector.

FIG. 3 illustrates an enlarged view of one first protector 8. As illustrated in FIG. 3, in the first inclined element 10 according to the embodiment, the centerline 10k in a width direction perpendicular to the longitudinal direction thereof extends straight. Alternatively, in the first inclined element 10, the centerline 10k, for example, may be curved in an arc shaped manner which protrudes outwardly or inwardly in the tyre radial direction (not illustrated). The first inclined element 10, in this embodiment, is configured to include a constant width portion 10E having a substantially constant width perpendicular to the longitudinal direction thereof. The first inclined element 10 has high stiffness which shears mud effectively. Note that "substantially constant" shall include not only a completely constant width but also a width which varies with a difference between the maximum width and the minimum width being equal to or less than 5%.

In the second inclined element 11 according to the embodiment, the centerline 11k in a width direction perpendicular to the longitudinal direction thereof extends in an arc shaped manner which protrudes outwardly in the tyre radial direction. Alternatively, the centerline 11k of the second inclined element 11, for example, may extend in a straight manner (not illustrated), or in an arc shaped manner which protrudes inwardly in the tyre radial direction (not illustrated). The second inclined element 11, in this embodiment, is configured to include a constant width portion 11E having a substantially constant width perpendicular to the longitudinal direction thereof.

Angles $\theta 1$ and $\theta 2$ of the first inclined element 10 and the second inclined element 11, respectively, are preferably equal to or less than 60 degrees with respect to the tyre circumferential direction. Thus, when the tyre 1 travels in mud, these elements 10 and 11 can shear mud effectively. When the angles $\theta 1$ and $\theta 2$ tend to be small excessively, stiffness in the tyre radial direction of each first protector 8 is prone to be low, there is a risk that chipping or cracks tend to occur easily on the first protectors 8. Thus, the angles $\theta 1$ and $\theta 2$ are preferably equal to or more than 10 degrees.

In order to improve the above effect further, an angle $\theta 3$ between the first inclined element 10 and the second inclined element 11 are preferably in a range of from 30 to 70 degrees. As used herein, the angle $\theta 1$ is an angle between the centerline 10k of first inclined element 10 and a tangent line n of a tyre circumferential line. The angle $\theta 2$ is an angle between the centerline 11k of second inclined element 11 and the tangent line n of the tyre circumferential direction. The tangent line n of the tyre circumferential line passes an intersection of the centerlines 10k and 11k of the first inclined element 10 and the second inclined element 11, respectively. The angle $\theta 3$ is an angle between the centerlines 10k and 11k of the first inclined element 10 and the second inclined element 11, respectively.

Preferably, a length La in the tyre radial direction of the first inclined element 10 is in a range of from 90% to 110% of a length Lb in the tyre radial direction of the second inclined element 11. Accordingly, the difference in circumferential component length between the first inclined element 10 and the second inclined element 11 tends to be small, and thus it can suppress cut damage effectively.

Each first protector 8, in this embodiment, further includes a radial-direction element 12 which is connected to the first inclined element 10. In this embodiment, the radial-direction element 12 extends toward the tread portion 2 along (e.g., in parallel with) the tyre radial direction such that an outermost end thereof forms the outermost ends 7e in the tyre radial direction of the side protectors 7. Such a radial-direction element 12 has high stiffness in the tyre radial direction, suppressing deformation of the first protectors 8 to help generating high shearing force. Note that "along the tyre radial direction" shall mean to include an aspect where a centerline 12k in a width direction perpendicular to the longitudinal direction of the radial-direction element 12 has an angle θa equal to or less than 10 degrees with respect to the tyre radial direction.

In this embodiment, the radial-direction element 12 has a length in the tyre radial direction smaller than that of the first inclined element 10. This may make it possible to increase a component in the tyre circumferential direction of the first inclined element 10, and thus the first inclined element 10 can protect a wide region in the tyre circumferential direction of the buttress portions 5. In view of the above, a length Lc in the tyre radial direction of the radial-direction element 12 is preferably in a range of from 60% to 90% of the length La in the tyre radial direction of the first inclined element 10.

Figure 4:
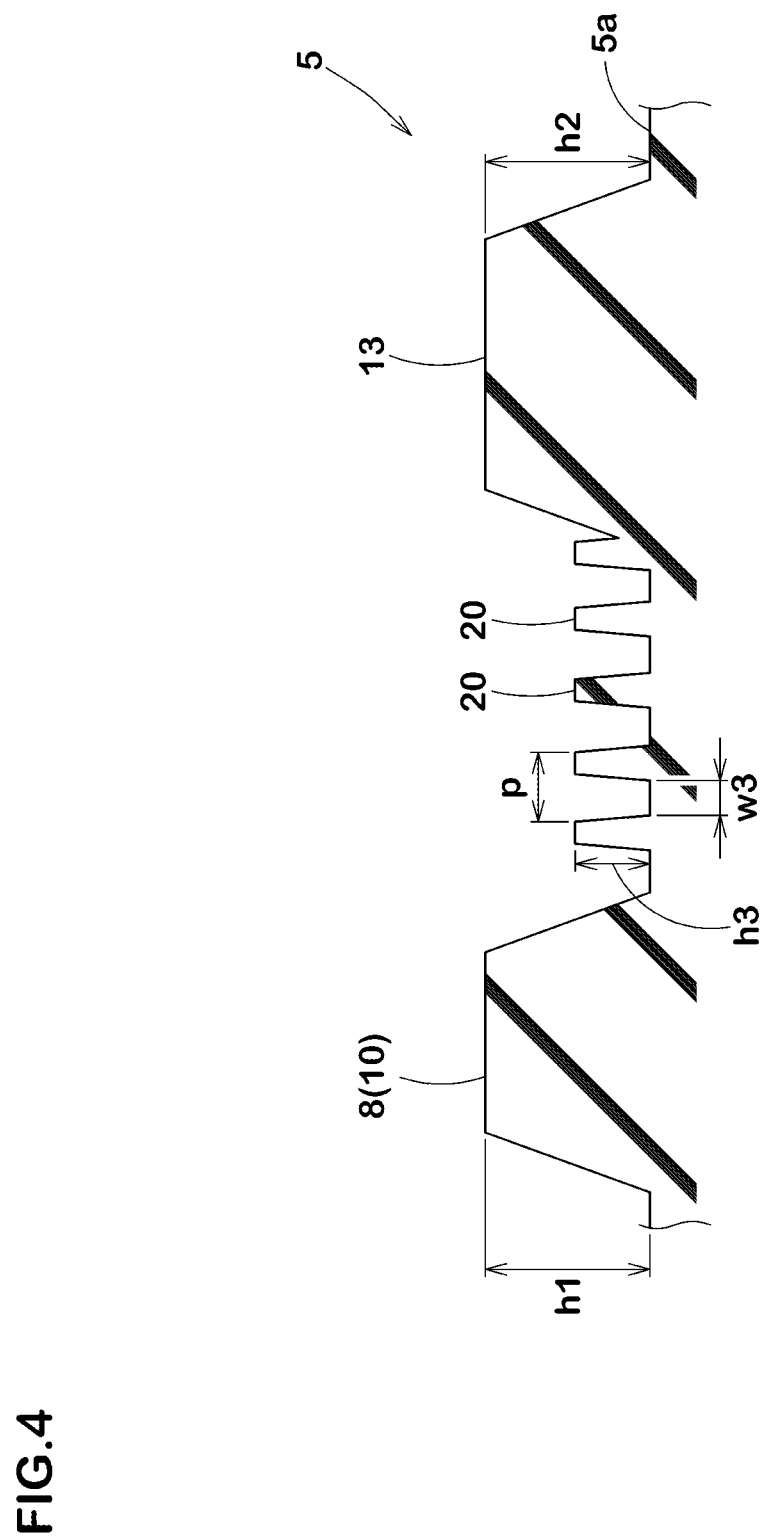
FIG. 4 is a cross-sectional view taken along line A-A of FIG. 2.

FIG. 4 illustrates a cross-sectional view taken along line A-A of FIG. 2. As illustrated in FIG. 4, a protruding heights h1 of each the first protectors 8 is preferably in a range of from 2.0 to 10.0 mm. Further, it is preferable that widths w1 of the first inclined element 10 and the second inclined element 11 (shown in FIG. 3) are in a range of from 5.0 to 15.0 mm. As used herein, the protruding height is a height from an outer surface 5a of the buttress portion 5. As shown in FIG. 1, the outer surface 5a of the buttress portion 5, in a cross-sectional view of the tyre under the normal state, is a smooth outer surface that extends in substantially parallel with a carcass profile by removing protrusions (e.g., ornamental serrate protrusions and ribs for displaying trademark) provided on the buttress portion 5.

As illustrated in FIG. 2, the side protectors 7, in this embodiment, optionally include at least one of second protectors 13, third protectors 14, or fourth protectors 15 which are different in shape from the first protectors 8. The second protectors 13 according to the embodiment are different in shape from not only the third protectors 14 but also the fourth protectors 15. In this embodiment, the third protectors 14 are different in shape from the fourth protectors 15.

In this embodiment, the second protectors 13 each extend inwardly in the tyre radial direction from an outer end thereof which corresponds to the outermost ends 7e in the tyre radial direction of the side protectors 7. The second protectors 13, for example, are arranged between first protectors 8 with gaps in the tyre circumferential direction.

The second protectors 13, in this embodiment, are provided with shallow grooves 16 extending in the tyre radial direction. In this embodiment, the shallow grooves 16 extends along (e.g., in parallel with) the tyre radial direction so as to divide the second protectors 13 into two sections. Such shallow grooves 16 increase edge component in the tyre radial direction of the second protectors 13, thus enabling to improve traction. Preferably, the shallow grooves 16 have depths (not illustrated) equal to or less than 50% of protruding heights h2 (shown in FIG. 4) of the second protectors 13.

The second protectors 13 are divided into first sections 13A and second sections 13B by the shallow grooves 16. In this embodiment, the respective first sections 13A are arranged on one side in the tyre circumferential direction with respect to the respective shallow grooves 16 and have a L-shaped manner (an inclined L-shaped manner). In this embodiment, the respective second sections 13B are arranged on another side in the tyre circumferential direction with respect to the respective shallow grooves 16 and have an I-shaped manner extending in the tyre circumferential direction. The first sections 13A can increase edge components in the tyre circumferential direction, thus enabling to protect the buttress portions 5 widely. The second sections 13B can increase shearing force in mud. Note that the second protectors 13 are not limited to such an aspect but can be modified in various aspects.

Preferably, the protruding heights h2 of the second protectors 13 are in a range of from 2.0 to 10.0 mm.

The third protectors 14, in this embodiment, are formed into a triangular shape which includes an outer surface 14A with a circumferential edge 14e extending along the tyre circumferential direction. The third protectors 14 tend to have high stiffness in the tyre circumferential direction, thus enabling to improve shearing force by suppressing deformation thereof when the tyre 1 rotates. The circumferential edge 14e, for example, corresponds to innermost ends 7i in the tyre radial direction of the side protectors 7.

In this embodiment, the respective third protectors 14 are located inwardly in the tyre radial direction of vertexes 8a of the respective first protectors 8 where the first inclined elements 10 and second inclined elements 11 cross with each other. Further, the respective third protectors 14, for example, are adjacent to the respective second inclined elements 11 in the tyre circumferential direction such that the respective third protectors 14 overlaps the respective second inclined elements 11 in the tyre radial direction.

In this embodiment, fourth protectors 15 are formed into a triangular shape which includes an outer surface 15A in the tyre axial direction having a circumferential edge extending along the tyre circumferential direction. The fourth protectors 15 tend to have high stiffness in the tyre circumferential direction, thus enabling to improve shearing force by suppressing deformation thereof when the tyre 1 rotates. The circumferential edges 15e, for example, correspond to outermost ends 7e in the tyre radial direction of the side protectors 7.

The respective fourth protectors 15, in this embodiment, are located outwardly in the tyre radial direction of the vertexes 8a of the respective first protectors 8. Further, the respective fourth protectors 15, for example, are adjacent to the respective first inclined elements 10 in the tyre circumferential direction such that the respective fourth protectors 15 overlaps the respective first inclined elements 10 in the tyre radial direction. Furthermore, the respective fourth protectors 15 are provided at locations such that the respective fourth protectors 15 are adjacent to the respective first sections 13A in the tyre circumferential direction and overlap the respective first sections 13A in the tyre radial direction.

Preferably, protruding heights (not illustrated) of the third protectors 14 and the fourth protectors 15, for example, are in a range of from 2.0 to 10.0 mm, more preferably same as the protruding heights h1 of the first protectors 8.

Preferably, the side protectors 7 are arranged in such a way that one or more side protectors 7 are always present on arbitrary tyre radial lines, thus enabling to improve cut resistance further.

As illustrated in FIG. 1, the side protectors 7 are preferably arranged such that distances in the tyre radial direction between the outermost ends 7e of the side protectors 7 and the tread edge 2t are in a range of from 15% to 30% of the tyre section height H. Further, distances in the tyre radial direction between the innermost ends 7i of the side protectors 7 and the tread edge 2t are in a range of from 35% to 55% of the tyre section height H. Thus, the side protectors 7 can be arranged on a region where cut damages tend to occur, and exert powerful traction in mud. Note that the tyre section height H is a radial distance from the bead baseline BL to a ground contact surface of the tread portion 2 at the tyre equator C.

Figure 5:
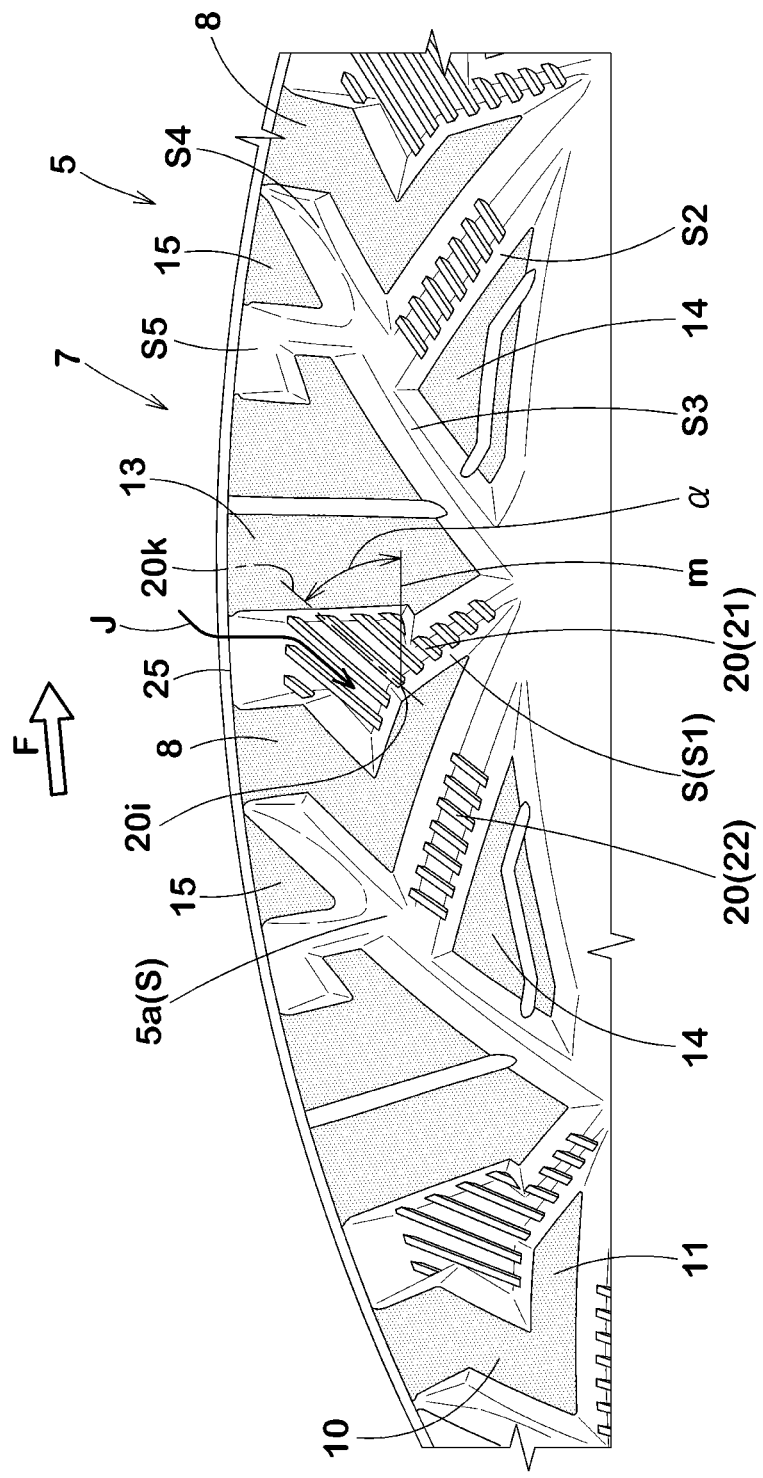
FIG. 5 is a side view of the buttress portion.

FIG. 5 illustrates a side view of one of the buttress portions 5. As illustrated in FIG. 5, the buttress portion 5, in this embodiment, gaps S are provided between adjacent side protectors 7 in the tyre circumferential direction. In this embodiment, due to the above-mentioned arrangement of the side protectors 7, the gaps S include first gaps S1 to fifth gaps S5. In this embodiment, the first gaps S are provided between the first protectors 8 and the second protectors 13. In this embodiment, the second gaps S2 are provided between the first protectors 8 and the third protectors 14. In this embodiment, the third gaps S3 are provided between the second protectors 13 and the third protectors 14. In this embodiment, the fourth gaps S4 are provided between the first protectors 8 and the fourth protectors 15. In this embodiment, the fifth gaps S5 are provided between the second protectors 13 and the fourth protectors 15.

The first gaps S1 and the second gaps S2, in this embodiment, have respective widths perpendicular to the respective longitudinal direction thereof wider than those of the third gaps S3 and the fourth gaps S4.

In this embodiment, a plurality of ribs 20 is provided on at least one of the gaps S. The ribs 20 have protruding heights h3 (shown in FIG. 4) smaller than that of the first protectors 8 and the second protectors 13. In this embodiment, the ribs 20 protrude outwardly in the tyre axial direction from the outer surface 5a of the buttress portion 5. The ribs 20 enable to suppress cut damage on the gaps S effectively.

The ribs 20, in this embodiment, include a plurality of first ribs 21 provided on the first gaps S1 and a plurality of second ribs 22 provided on the second gaps S2. In this embodiment, the ribs 20 are provided on the first gaps S1 and the second gaps S2 which have relatively large widths, thus enabling to maintain high cut resistance.

The first ribs 21, in this embodiment, connect the first protectors 8 and the second protectors 13. Such first ribs 21 can suppress deformation of the first protectors 8 and the second protectors 13 so as to maintain sufficient volume of the first gaps S1 when traveling, thus enabling to provide powerful grip and shearing force in mud.

The ribs 20 can help mud thereon sliding smoothly in a certain direction. That is, the mud tends to slide easily along the longitudinal direction of the ribs 20. Since the first ribs 21, in this embodiment, are inclined in the same direction as with each other with respect to the tyre circumferential direction, the mud flows the same direction as the ribs 20 smoothly, improving traveling performance in mud.

In this embodiment, the first ribs 21, toward outwardly in the tyre radial direction, are inclined in one side in the tyre circumferential direction. When the tyre 1 rotates in a direction shown in an arrow F, due to the rotation of the tyre 1, mud flows smoothly and enters the first gaps S1 through radially outer ends 25 of the first gaps S1 in a direction shown in an arrow J, thus enabling to provide powerful mud shearing force, for example. On the other hand, when the tyre 1 rotates in the opposite direction to the arrow F, due to the rotation of the tyre 1, the ribs 21 help to discharge mud in the first gaps S1 smoothly along the opposite direction shown in the arrow J through the outer ends 25 of the first gaps S1, thus enabling to provide powerful traction, for example.

The first ribs 21, for example, are inclined in the same direction as the first inclined elements 10. Thus, mud flow generated by the first inclined elements 10, which have much opportunities to be in contact with mud by being provided on radially outwardly in the tyre radial direction of the second inclined elements 11, tends to match mud flow generated by the first ribs 21, allowing to ensure smooth mud flow around the buttress portions 5 provided with side protectors 7.

The first ribs 21, in this embodiment, are connected to the second inclined elements 11, thus enabling to enhance stiffness in the width direction of the second inclined element 11. This makes it possible to suppress deformation of the second inclined elements 11 as well as the first inclined elements 10 when traveling so that grip and shearing force in mud can be improved.

The second ribs 22, in this embodiment, connect the first protectors 8 and the third protectors 14. Such second ribs 22 enable to suppress deformation of the first protectors 8 and the third protectors 14 when traveling. This makes it possible to maintain sufficient volume of the second gaps S2 so that grip and shearing force in mud can be improved.

The second ribs 22, for example, are inclined in the same direction as the first inclined elements 10. Further, the second ribs 22, in this embodiment, are connected to the second inclined element 11. Thus, the above-mentioned effect can be exerted effectively.

Note that the ribs 20 are not limited to such an aspect but can be modified in such a way that the ribs 20 are arranged on the third gaps S3 to connect the second protectors 13 and the third protectors 14, for example. Further, the ribs 20, for example, may be arranged on the fourth gaps S4 to connect to the first protectors 8 and the fourth protectors 15. Furthermore, the ribs 20 may be arranged on the fifth gaps S5 to connect to the second protectors 13 and the fourth protectors 15.

A region which is proximate to the outermost ends 7e of the side protectors 7 has a larger rubber thickness than an inner region located inwardly in the tyre radial direction thereof, thus less deterioration of cut damage occurs. Further, the gaps S that are provided with ribs 20, as compared with gaps S that are not provided with ribs 20, tend to deteriorate grip and shearing force in mud since mud is difficult to enter therein. In view of above, the ribs 20, in this embodiment, are provided on an inner region in the tyre radial direction of the side protectors 7. More specifically, it is preferable that no ribs 20 are provided on a radially outer region which has a radial length of 15% of a side protector radial length L from the outermost ends 7e of the side protectors 7. In this embodiment, no ribs 20 are provided on the fifth gaps S5.

As illustrated in FIG. 4, it is preferable that protruding heights h3 of the ribs 20 are in a range of from 0.5 to 3.0 mm. Further, it is preferable that widths w3 of the ribs 20 which are perpendicular to respective longitudinal directions thereof are in a range of from 0.5 to 2.5 mm. Furthermore, it is preferable that arrangement pitches are in a range of from 2.0 to 8.5 mm.

Further, the ribs 20 preferably have angles α in a range of from 20 to 70 degrees, more preferably of from 30 to 60 degrees with respect to the tyre circumferential direction. The angles α are angles between width centerlines 20k of the respective ribs 20 and tangent lines m of respective tyre circumferential lines passing inner ends 20i in the tyre radial direction of the respective ribs 20.

While the particularly preferable embodiments in accordance with the present disclosure have been described in detail, the present disclosure is not limited to the illustrated embodiments, but can be modified and carried out in various aspects.

EXAMPLE

Tyres having a basic structure shown in FIG. 1 and buttress portions shown in FIG. 2 were prototyped based on the detail shown in Table 1. Then, mud performance and cut resistance performance of each test tyres was tested. Further, the side protectors of Ref. 1 (comparative example) were same as the embodiment excluding the feature that the first protectors each consist of the radial-direction element and the second inclined element. Note that in Ref. 1 and Ex. 1 to Ex. 12, volume of the respective first protectors are the same as with each other and volume of the respective ribs are the same as with each other. Regarding item of "Second rib inclination" in Table 1, "A" represents the same direction as the first ribs, and "B" represents the opposite direction to the first ribs. The common specification and the testing methods for the test tyres are as follows.

Tyre size: 35×12.5R20LT
Rim size: 20×10 J
Inner pressure: 450 kPa
First ribs inclination: same as first inclined element Mud Performance Test:

In each example, four test tyres were mounted to a four-wheel-drive vehicle having a displacement of 3500 cc. Then, a test driver drove the vehicle on a test course of mud terrain to evaluate driving performance to traction by the driver's feeling. The test results are shown in Table 1 using a score system where Ref. 1 is set to 100. The larger value indicates better mud performance with powerful traction.

Cut Resistance Performance Test:

A test driver drove the above test vehicle for 1,500 km on rocky roads, and then the buttress portions of the test tyres in appearance were scored based on depths and lengths of cuts on the buttress portions. The test results are shown in Table 1 using a score system where Ref. 1 is set to 100. The larger value indicates better cut resistance performance with small cut damage.

Table 1 shows the test results.

TABLE 1

|  | Ref. 1 | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
| --- | --- | --- | --- | --- | --- | --- | --- | --- | --- | --- | --- | --- | --- |
| First protector angles θ3 (degrees) | — | 45 | 30 | 70 | 45 | 45 | 45 | 45 | 45 | 45 | 45 | 45 | 45 |
| Rib angles α (degrees) | 45 | 45 | 45 | 45 | 20 | 70 | 45 | 45 | 45 | 45 | 45 | 45 | 45 |
| Rib widths w3 (mm) | 1.0 | 1.0 | 1.0 | 1.0 | 1.0 | 1.0 | 0.5 | 2.5 | 1.0 | 1.0 | 1.0 | 1.0 | 1.0 |
| Rib pitches p (mm) | 5.0 | 5.0 | 5.0 | 5.0 | 5.0 | 5.0 | 5.0 | 5.0 | 2.0 | 8.5 | 5.0 | 5.0 | 5.0 |
| Rib protruding heights h3 (mm) | 1.0 | 1.0 | 1.0 | 1.0 | 1.0 | 1.0 | 1.0 | 1.0 | 1.0 | 1.0 | 0.5 | 3.0 | 1.0 |
| Second rib inclination | A | A | A | A | A | A | A | A | A | A | A | A | B |
| Mud performance [score: larger is better] | 100 | 120 | 110 | 120 | 120 | 115 | 115 | 120 | 120 | 110 | 115 | 120 | 110 |
| Cut resistance performance [score: larger is better] | 100 | 110 | 110 | 100 | 105 | 110 | 110 | 105 | 105 | 110 | 105 | 105 | 110 |
| Total | 200 | 230 | 220 | 220 | 225 | 225 | 225 | 225 | 225 | 220 | 220 | 225 | 220 |

From the test results, it is confirmed that the tyres of examples improve mud performance and cut resistance performance as compared with the comparative example tyre.

What is claimed is:

1. A pneumatic tyre comprising:
   a tread portion; and
   a pair of buttress portions each extending inwardly in a tyre radial direction from a respective one of tread edges,
   at least one of the pair of buttress portions being provided with side protectors protruding outwardly in a tyre axial direction,
   the side protectors comprising first protectors arranged in a tyre circumferential direction, each first protector comprising a lateral V-shaped portion comprising a first inclined element inclined with respect to the tyre circumferential direction and a second inclined element inclined in an opposite direction to the first inclined element with respect to the tyre circumferential direction and connected to the first inclined element,
   the side protectors further comprising second protectors different in shape from the first protectors,
   the second protectors being arranged between first protectors with gaps in the tyre circumferential direction,
   at least one of the gaps being provided with ribs having smaller protruding heights than those of the first protectors and the second protectors,
   the side protectors further comprising third protectors different in shape from the first protectors and the second protectors,
   the third protectors being arranged between first protectors with gaps in the tyre circumferential direction, and
   at least one of the gaps between the first protectors and the third protectors being provided with ribs having smaller protruding heights than those of the first protectors and the third protectors.

2. The pneumatic tyre according to claim 1, wherein an angle of the first inclined element with respect to the tyre circumferential direction and an angle of the second inclined element with respect to the tyre circumferential direction are equal to or less than 60 degrees.

3. The pneumatic tyre according to claim 1, wherein an angle between the first inclined element and the second inclined element is in a range of from 30 to 70 degrees.

4. The pneumatic tyre according to claim 1, wherein protruding heights of the first protectors are in a range of from 2.0 to 10.0 mm, and widths of the first inclined element and the second inclined element perpendicular to respective longitudinal direction thereof are in a range of from 5.0 to 15.0 mm.

5. The pneumatic tyre according to claim 1, wherein in each first protector, the first inclined element is located outwardly in the tyre radial direction of the second inclined element, and
   the first inclined element is connected to a radial-direction element that extends toward the tread portion in parallel with the tyre radial direction.

6. The pneumatic tyre according to claim 1, wherein protruding heights of the second protectors are in a range of from 2.0 to 10.0 mm.

7. The pneumatic tyre according to claim 1, wherein the ribs are inclined in a same direction as with one another with respect to the tyre circumferential direction.

8. The pneumatic tyre according to claim 1, wherein the ribs connect the first protectors and the second protectors.

9. The pneumatic tyre according to claim 5, wherein the ribs being inclined in a same direction as the first inclined element.

10. The pneumatic tyre according to claim 1, wherein protruding heights of the ribs are in a range of from 0.5 to 3.0 mm,
widths of the ribs perpendicular to respective longitudinal directions thereof are in a range of from 0.5 to 2.5 mm, and
the ribs are arranged at pitches in a range of from 2.0 to 8.5 mm.

11. The pneumatic tyre according to claim 1, wherein distances in the tyre radial direction between outermost ends of the side protectors and a tread edge are in a range of from 15% to 30% of a tyre section height, and
distances in the tyre radial direction between innermost ends of the side protectors and the tread edge are in a range of from 35% to 55% of the tyre section height.

12. The pneumatic tyre according to claim 1, wherein no ribs are provided on a radially outer region which has a radial length of 15% of a side protector radial length from outermost ends of the side protectors.

13. The pneumatic tyre according to claim 1, wherein the third protectors are located inwardly in the tyre radial direction of the second protectors.

14. The pneumatic tyre according to claim 1, wherein the first protectors each include a vertex where the second inclined element and the first inclined element are connected with each other, and
the respective third protectors are located inwardly in the tyre radial direction of the vertex of a respective one of the respective first protectors.

15. The pneumatic tyre according to claim 13, wherein the first protectors each include a vertex where the second inclined element and the first inclined element are connected with each other, and
the respective third protectors are located inwardly in the tyre radial direction of the vertex of a respective one of the respective first protectors.

16. The pneumatic tyre according to claim 1, wherein the third protectors are formed into a triangular shape which includes an outer surface with a circumferential edge extending along the tyre circumferential direction.

17. The pneumatic tyre according to claim 13, wherein the third protectors are formed into a triangular shape which includes an outer surface with a circumferential edge extending along the tyre circumferential direction.

18. The pneumatic tyre according to claim 14, wherein the third protectors are formed into a triangular shape which includes an outer surface with a circumferential edge extending along the tyre circumferential direction.

19. A pneumatic tyre comprising:
a tread portion; and
a pair of buttress portions each extending inwardly in a tyre radial direction from a respective one of tread edges,
at least one of the pair of buttress portions being provided with side protectors protruding outwardly in a tyre axial direction,
the side protectors comprising first protectors arranged in a tyre circumferential direction, each first protector comprising a lateral V-shaped portion comprising a first inclined element inclined with respect to the tyre circumferential direction and a second inclined element inclined in an opposite direction to the first inclined element with respect to the tyre circumferential direction and connected to the first inclined element, and
the side protectors further comprising second protectors different in shape from the first protectors,
the second protectors being arranged between first protectors with gaps in the tyre circumferential direction,
at least one of the gaps being provided with ribs having smaller protruding heights than those of the first protectors and the second protectors, and
the ribs are inclined in a same direction as with one another in a range of 20 to 70 degrees with respect to the tyre circumferential direction.

* * * * *